United States Patent [19]

Boury et al.

[11] Patent Number: 5,621,897
[45] Date of Patent: Apr. 15, 1997

[54] METHOD AND APPARATUS FOR ARBITRATING FOR A BUS TO ENABLE SPLIT TRANSACTION BUS PROTOCOLS

[75] Inventors: Bechara F. Boury, Boca Raton, Fla.; Charles E. Kuhlmann, Youngsville, N.C.; Terence J. Lohman, Boca Raton, Fla.; Neil W. Songer, San Jose, Calif.; Ronald E. Valli, West Columbia, S.C.

[73] Assignee: International Business Machines Corporation, Armonk, N.Y.

[21] Appl. No.: 421,114

[22] Filed: Apr. 13, 1995

[51] Int. Cl.⁶ .................................................. G06F 13/36
[52] U.S. Cl. ........................................ 395/296; 395/293
[58] Field of Search ............................. 395/290, 293, 395/296, 299, 303, 309, 310

[56] References Cited

U.S. PATENT DOCUMENTS 4,785,394  11/1988  Fischer ..................... 395/294
4,789,926  12/1988  Clarke ...................... 395/296
5,257,356  10/1993  Brockmann et al. ............ 395/290
5,469,435  11/1995  Krein et al. ................ 370/85.2

*Primary Examiner*—Glenn A. Auve
*Attorney, Agent, or Firm*—George E. Grosser

[57] ABSTRACT

An arrangement and method for arbitration to enable split transaction bus protocols provides for a slave to assert a mask signal that sets a mask bit in a mask register when the slave is not ready to complete a requested transaction. A requesting master is forced off the bus and prevented from re-arbitrating while the mask bit is set in the register. When the slave is ready to complete the transaction, a release master signal is asserted which causes the bit in the shift register to be reset. The requesting master is then able to re-arbitrate for use of the bus to complete the transaction. The usable bandwidth of the bus is increased since other masters are able to arbitrate and use the bus until the slave is ready to complete the transaction with the first requesting master.

35 Claims, 4 Drawing Sheets

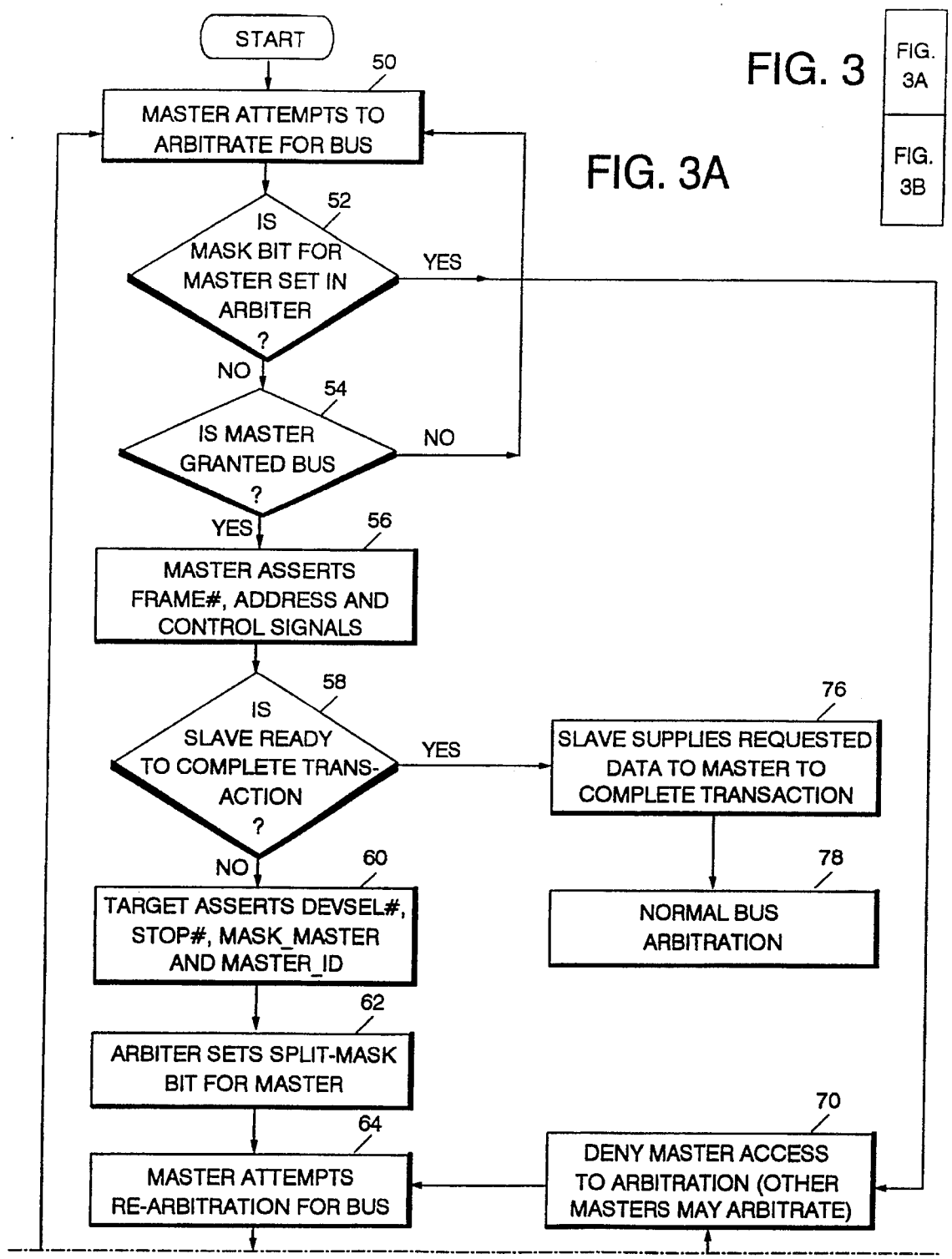

METHOD AND APPARATUS FOR ARBITRATING FOR A BUS TO ENABLE SPLIT TRANSACTION BUS PROTOCOLS

BACKGROUND OF THE INVENTION

The present invention relates to the transfer of information over a bus, and more particularly, to arbitration methods and apparatus for arbitrating for use of the bus among a plurality of masters and slaves coupled to the bus.

In personal computers, the utilization of an input/output (I/O) bus can be a limiting factor if this bus is not properly designed and implemented. Certain I/O buses, such as the industry standard architecture (ISA) bus, are adequate for single-user personal computers that do not require extensive video and direct access storage device (DASD) access. With the advent of multi-tasking operating systems and multi-processor (MP) hardware, however, the video and DASD subsystems take up the available I/O bus and memory subsystem bandwidths. This can severely limit the performance of the system as a whole. The attempts to solve this problem involve the use of new and faster I/O buses, such as the Microchannel and the EISA buses. Although partially successful, the demand for even faster buses has become apparent. These faster buses have been necessitated by the faster I/O devices (bus masters) that have become available. The previous buses became overwhelmed, especially in workstations and servers, where multiple masters (such as DASD, LAN, video adapters) commonly reside on the same I/O bus.

The personal computer industry has recently defined a bus standard known as the peripheral component interface (PCI) bus in an attempt to meet the current needs for a faster I/O bus. The PCI bus is well known and the specification of this bus is herein expressly incorporated by reference.

The PCI bus is a general purpose, standard bus, with high throughput. As currently specified, the PCI bus has a theoretical potential of transferring of up to 264 MB/sec. However, this performance is usually never attained since the slave device (typically memory) cannot access or store data at this high rate. Most memory subsystems are limited to a 40–80 MB/sec data transfer rate. The slave device is then forced to insert wait states between the address and data phases of the transfer. This can easily cut the actual bandwidth to ½ or ¼ of the theoretical maximum bandwidth. It is therefore desirable to increase the usable bandwidth of the PCI bus towards its theoretical maximum.

In typical computer systems, there are commonly three phases to a data transfer:

(1) the arbitration phase;
(2) the address/command phase (hereinafter the "address phase"); and
(3) the actual data transfer phase.

The PCI bus is a "connected transaction bus" which is defined as a bus for which a data phase always immediately follows an address phase (wait states are not considered). In other words, the address phase and data phase are connected such that the data transferred during a data phase is always associated with the address placed on the bus immediately preceding the data phase. The PCI bus allows arbitration phases to overlap with the address and data phases, but does not allow address and data phases to overlap, nor does it allow data phases to occur out of order with respect to the address phase.

By contrast, a bus known as a "split transaction bus" typically has four phases to a data transfer:

(1) address arbitration phase;
(2) address/command phase;
(3) data arbitration phase; and
(4) data transfer phase.

In a split transaction bus the data phase does not have to immediately follow the associated address phase placed on the bus. It is not necessary that the data phases occur in the same order that the corresponding address phases occur. Therefore, it is possible for a master to execute multiple address phases before any data is returned. It is also possible to overlap a second master's address phase with a first master's data phase. The address arbitration in a split transaction bus is similar to that of a connected transaction bus. One difference, however, is that on the address phase, the master asserts an address/command signal and a transaction identification (ID) and then immediately releases the address bus. The master may then either wait until the slave returns the data or re-arbitrate for the address bus and execute additional address phases. The slave stores the address/command and the master identification issued during the address phase and then arbitrates for the data bus when it is ready to complete the transfer. When the slave is granted the data bus, it places the transaction ID on the bus at the same time it places the data on the data bus. The master then recognizes its transaction ID and will accept the data, thereby completing the transaction.

In contrast to a split transaction bus, a conventional PCI bus does not use a master that immediately releases the address bus upon the assertion of address/command and identification. Instead, on a conventional PCI bus, the signaling by a slave that it is not ready to complete the transaction causes a retry of the master (a "back-off/retry" feature). This causes the PCI master to re-arbitrate immediately in order to retry the transaction again. The master will normally keep requesting the bus and re-trying the same transaction until the slave is ready, making it more difficult for other masters to use the bus. This reduces the usable bandwidth of the PCI bus.

SUMMARY OF THE INVENTION

There is a need for an arbitration mechanism and arrangement that will allow a connected transaction bus, such as the PCI bus, to operate in a split transaction bus manner in order to increase the usable bandwidth. With respect to the PCI bus in particular, there is a need to allow split transactions without affecting the PCI architecture or requiring existing or future PCI masters to change.

These and other needs are met by the present invention which provides a system comprising a bus, a plurality of masters coupled to the bus, these masters including logic for requesting arbitration for the bus and for initiating a transaction upon being granted the bus, a plurality of slaves coupled to the bus, with at least one of the slaves including logic for indicating readiness of the slave to complete the transaction, and an arbiter. The arbiter includes logic for forcing a master off the bus when a slave from which the transaction has been requested is not ready to complete the transaction. Logic is also provided for preventing the master from re-arbitrating for the bus until the slave is ready to complete the transaction.

By preventing the master from re-arbitrating for the bus until the slave is ready to complete the transaction, the bus is freed for use by other masters. This directly leads to an increase in the usable bandwidth of the bus towards its theoretical maximum potential.

In certain embodiments of the invention, the slave will assert a first signal indicating that it is not ready to complete a requested transaction. The signal causes a mask bit (a mask indicator) corresponding to the requesting master to be set in a mask register.

Preferred embodiments of the invention use a central arbiter in which the mask register is located. Once this mask bit is set, the master can continue requesting the bus, but the central arbiter will ignore the request and not grant the bus to the masked master.

In order to allow the requesting master to actively arbitrate for the bus, a slave that is ready to complete the transaction will send a second signal, which includes a mask release signal, that causes the mask bit corresponding to the requesting master to be re-set. This allows the master to re-arbitrate for the use of the bus and complete the transaction.

Certain preferred embodiments of the present invention include means for temporarily assigning the highest arbitration priority to the master whose mask has been re-set until the master is granted the bus. Once granted, the master's priority reverts back to its original value. This has the advantage of assuring that the unmasked master will be the next device to be granted the bus, thereby completing the split transaction in a timely manner.

In order to avoid the use of a master identification bus, certain embodiments of the invention release all of the masters that have been masked upon the assertion of a second signal by any one of the slaves. If a master that has been unmasked is granted priority, but the slave for which the transaction is requested is still not ready to complete the transaction, this master is simply re-masked and the remaining unmasked masters re-arbitrate. This occurs until the master that requested the transaction that is now ready to be completed wins the arbitration for the bus. This method is a less efficient manner of executing the split transaction than the use of a master identification bus. However, this embodiment has the advantage of being less expensive and simpler to implement with respect to the hardware.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3, 3A, and 3B are a flow diagram illustrating an exemplary embodiment of the arbitration method of the present invention.

DETAILED DESCRIPTION OF THE DRAWINGS

In the description which follows, the example of the connected transaction bus used is a PCI bus. However, other buses which are connected transaction buses having a back-off/retry feature can be used with the arbitration mechanism of the present invention.

Figure 1:
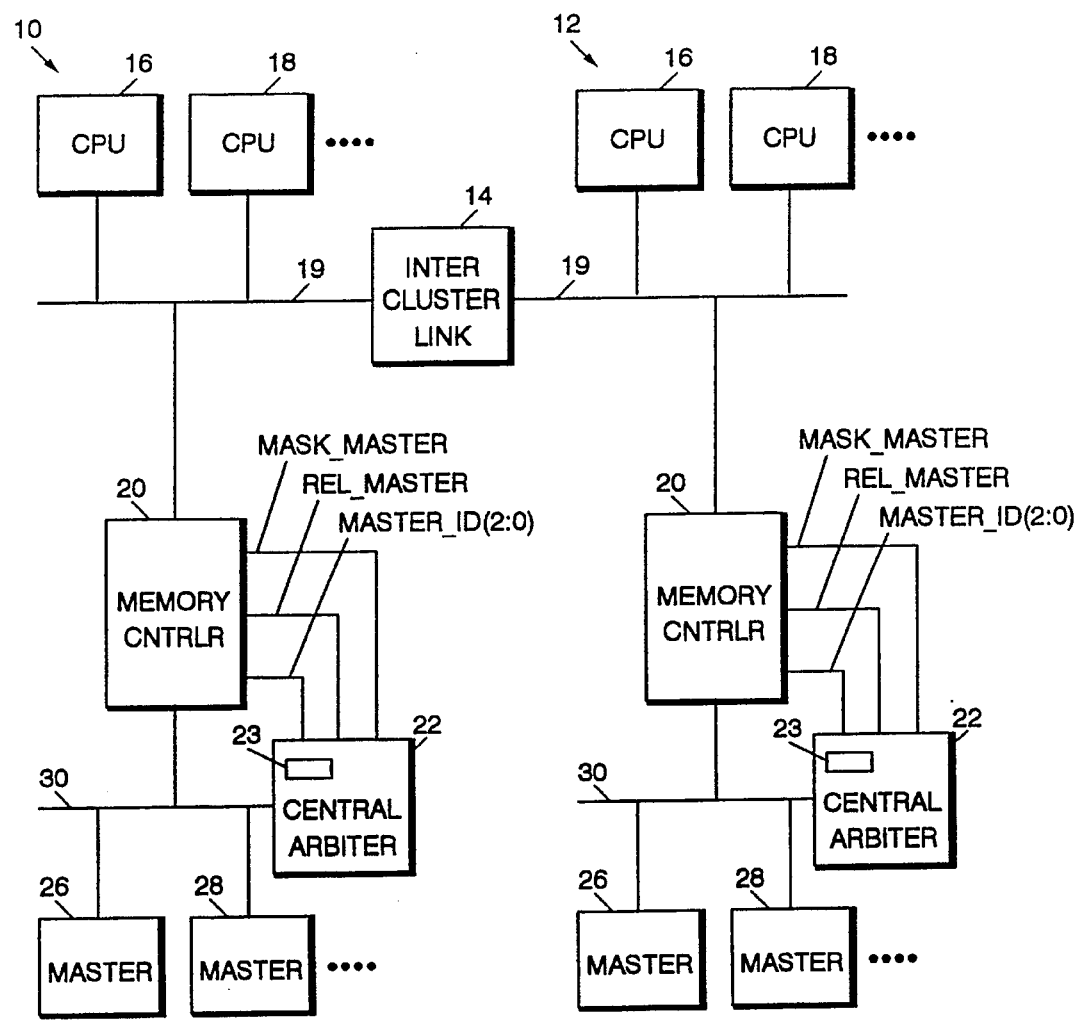
FIG. 1 is a block diagram showing a system that uses the arbitration mechanism and method of the present invention, and includes a central arbitration device.

A system arrangement is shown in FIG. 1 in which a multi-processor architecture is illustrated, although the invention is applicable to uni-processor applications. The multi-processor architecture illustrated in FIG. 1 is a symmetrical multi-processor architecture with shared coherent distributed memory. The exemplary architecture comprises a first cluster 10 and a second cluster 12 whose multi-processor buses are coupled by an inter-cluster link 14. Each multi-processor cluster 10, 12 has a plurality of CPU's 16, 18 coupled to the multi-processor bus 19 of that cluster. The multi-processor bus 19 is coupled to a memory controller 20. This memory controller 20 supplies data to the processors, such as CPU's 16, 18, as well as to I/O masters 26, 28. The I/O masters 26, 28 are coupled via a PCI bus 30 to the memory controller 20 and a PCI central arbiter 22.

In the architecture described in FIG. 1, latencies of data transfers can become large, and will affect both performance and available bus bandwidths. This becomes evident especially when a master on the PCI bus 30, such as master 26 of the first cluster 10, reads data located in memory located on cluster 12. The total latency for the reply data from memory could exceed three microseconds, for a transfer of a cache line. This would tie up the PCI bus for three microseconds for a 32-byte transfer, greatly limiting the available PCI bus bandwidth. The arbitration mechanism of the present invention, however, increases the overall bus bandwidth without affecting the PCI architecture and without requiring existing PCI masters to change.

The present invention provides for the communication of three sideband signals between the memory controller 20 and the PCI arbiter 22. These signals are the MASK_MASTER; REL_MASTER; and MASTER_ID. The use of these signals by the arbitration mechanism of the present invention will be described in more detail below.

For ease of explanation, in the following operational example, a master 26 desires a transaction with the memory controller 20 of its own cluster, such as cluster 10. The master 26 arbitrates for the use of the PCI bus 30 with the master 28. Assume that the central arbiter 22 determines that the master 26 wins the arbitration and grants the master 26 the use of the PCI bus 30. The master 26 asserts address and control signals, as well as FRAME# to request the data from the memory controller 20. In the prior art arrangements, if the memory controller 20 is not ready to send the data at this time, it will insert wait states until the controller 20 is ready to complete the transaction. At the same time, if other masters such as master 28 wish to utilize the bus, they are unable to do so since the transaction between master 26 and the memory controller 20 is occupying the bus. This arbitration sequence occurs in the prior art since the PCI bus is normally a connected transaction bus in which the data phase for the transaction immediately follows the address phase for that transaction on the bus, with wait states not counting.

The apparatus and method of the present invention overcomes this limitation of the PCI bus 30 by allowing it to perform split transactions. To do so, the requesting master 26 is forced off the PCI bus 30 and prevented from re-arbitrating until the memory controller 20 signals that it is ready to complete the transaction. This increases the usable bandwidth since other masters such as master 28 can arbitrate for and make use of the PCI bus 30 during this time. The present invention makes use of two additional signals, the MASK_MASTER signal and the REL_MASTER signal that are provided as sideband signals on the PCI bus 30. A third signal, the MASTER_ID signal, is used in certain embodiments to further increase bus efficiency by indicating which master is to be masked/released.

Figure 3B:
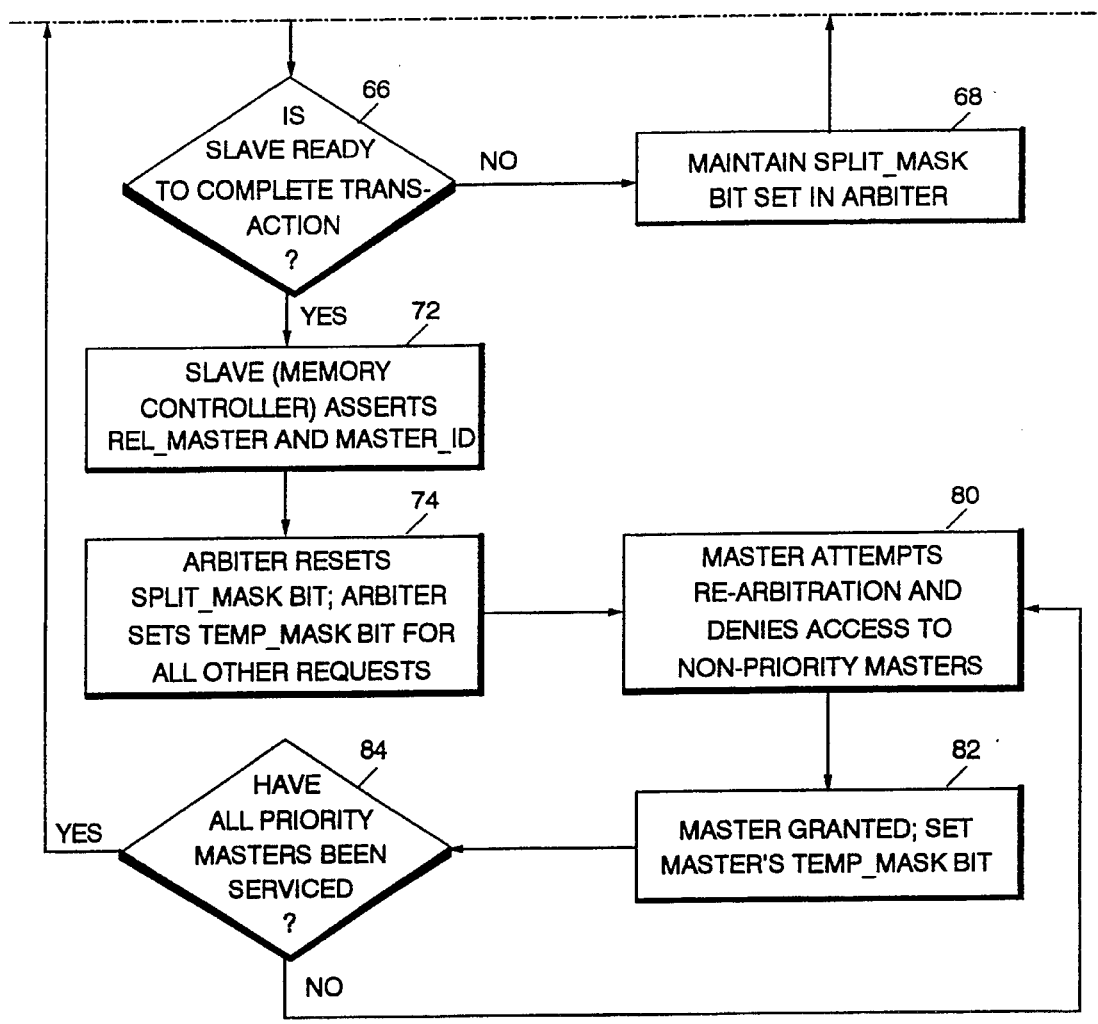

An embodiment of the method of the present invention is illustrated in flow diagram form in FIG. 3. In this example, the master 26 desires a transaction with the memory controller 20 which is acting as the slave for this transaction. In step 50, the master arbitrates for use of the PCI bus 30 with the other masters 28, etc. The central arbiter 22 determines whether a mask bit corresponding to the requesting master 26 is set in a SPLIT_MASK register 23 in the arbiter 22. This is performed in step 52. If the mask bit is not set, the arbiter 22 allows the master 26 to arbitrate for the PCI bus 30. If the master 26 is not granted the bus (step 54), the process returns to step 50 where the master 26 will continue arbitrating for the use of the bus 30.

Assume now that the master has won the arbitration and has been granted the bus 30 by the arbiter 22. The winning master 26 asserts FRAME# and address and control signals to the memory controller 20 on the PCI bus 30. It is then determined whether the slave (memory controller 20) is ready to complete the transaction (step 58). If the memory controller 20 is ready, it will supply the requested data to the master 26 to complete the transaction. Normal bus arbitration (step 78) then follows.

If the memory controller 20 is not ready to complete the transaction, the memory controller 20 (acting as a slave) asserts the signal DEVSEL# along with the signals STOP#, MASK_MASTER, and MASTER_I.D. in step 60. The MASK_MASTER and MASTER_I.D. signals are sent to the arbiter 22. The assertion of the DEVSEL# and STOP# signals by the controller 20 on the PCI bus 30 causes the retry of the master 26. At the same time, the arbiter 22 sets the SPLIT_MASK bit corresponding to master 26 in the SPLIT_MASK register 23 of the arbiter 22 (step 62).

With its SPLIT_MASK bit set in the SPLIT_MASK register 23, the master 26 attempts to re-arbitrate for the bus 30 in step 64. It is then determined in step 66 whether the controller 20 (the slave) is ready to complete the transaction. If it is not, the SPLIT_MASK bit is maintained (step 68) and the master 26 is denied the opportunity to re-arbitrate for the bus in step 70. Master 26 will then continue to attempt to re-arbitrate for the bus at step 64.

Steps 74, 80, 82 and 84 describe an embodiment of a priority determination that can be used in the present invention. In step 74, the arbiter 22 resets the SPLIT_MASK bit and sets a TEMP_MASK bit in a TEMP_MASK register for all other requests. In step 80, the master 26 (now a priority master) attempts to re-arbitrate, and access is denied to other masters whose bits are set in the TEMP_MASK register. The master is granted the bus in step 82, and the master's TEMP_MASK bit is set in the TEMP_MASK register. In step 84, it is determined whether all priority masters have been serviced. If not, the process returns to step 80. If all priority masters have been serviced, then the process returns to step 50.

Once the master 26 is granted the bus 30 (step 80), it asserts its address, control signals and FRAME# to the memory controller 20 (step 56). Since the memory controller 20 is ready to complete the transaction (step 58), the memory controller 20 will supply the requested data to the master 26 to complete the transaction (step 76) and normal bus arbitration will follow in step 78.

By the above-described method, the master 26 has been kept off the PCI bus 30 and prevented from re-arbitrating until the memory controller 20 is ready to complete the requested transaction. The other masters coupled to the bus 30 are able to arbitrate for and use the bus 30 during this time, thereby increasing the usable bandwidth of the bus 30.

It is desirable to execute the split transactions of the present invention efficiently. In order to do this, the slave needs to tell the arbiter 22 exactly which master should be unmasked in order to complete the data phase of the transaction. Additionally, it is preferable that the master be granted the bus as soon as possible (with high priority) since the slave may not be able to accept any more address phase transactions until it finishes the current data phase. In certain embodiments of the invention, a MASTER_ID bus is used, this embodiment being more efficient, but more expensive in terms of module pin count and logic. During the address phase, the slave drives a unique ID on the MASTER_ID bus, the ID being associated with the current address phase, while the slave is also asserting MASK_MASTER and executing a retry. The arbiter 22 then stores this unique ID and associates it with the master, such as master 26, that is currently on the bus 30. When the slave is ready, it places the ID on the bus 30 at the same time that it activates REL_MASTER. The arbiter 22 then resets only the SPLIT_MASK bit in the SPLIT_MASK register 23 that is associated with the MASTER_ID and temporarily gives it the highest arbitration priority. This has the effect of ensuring that the unmasked master becomes the next device to be granted the use of the bus 30, thereby completing the split transaction in a timely manner. If multiple masters are released before they complete the data phase, the arbiter 22 keeps track of the order that the released IDs occur and gives each master priority on the bus 30 one-by-one. This is most easily done by allowing the SPLIT_MASK bits to be reset one-by-one based on a predetermined algorithm. When the first master out of the queue initiates a frame, the next master is immediately released. This will cause the next master to complete arbitration during the current master's frame and therefore provide the most efficient use of the PCI bus 30.

Figure 2:
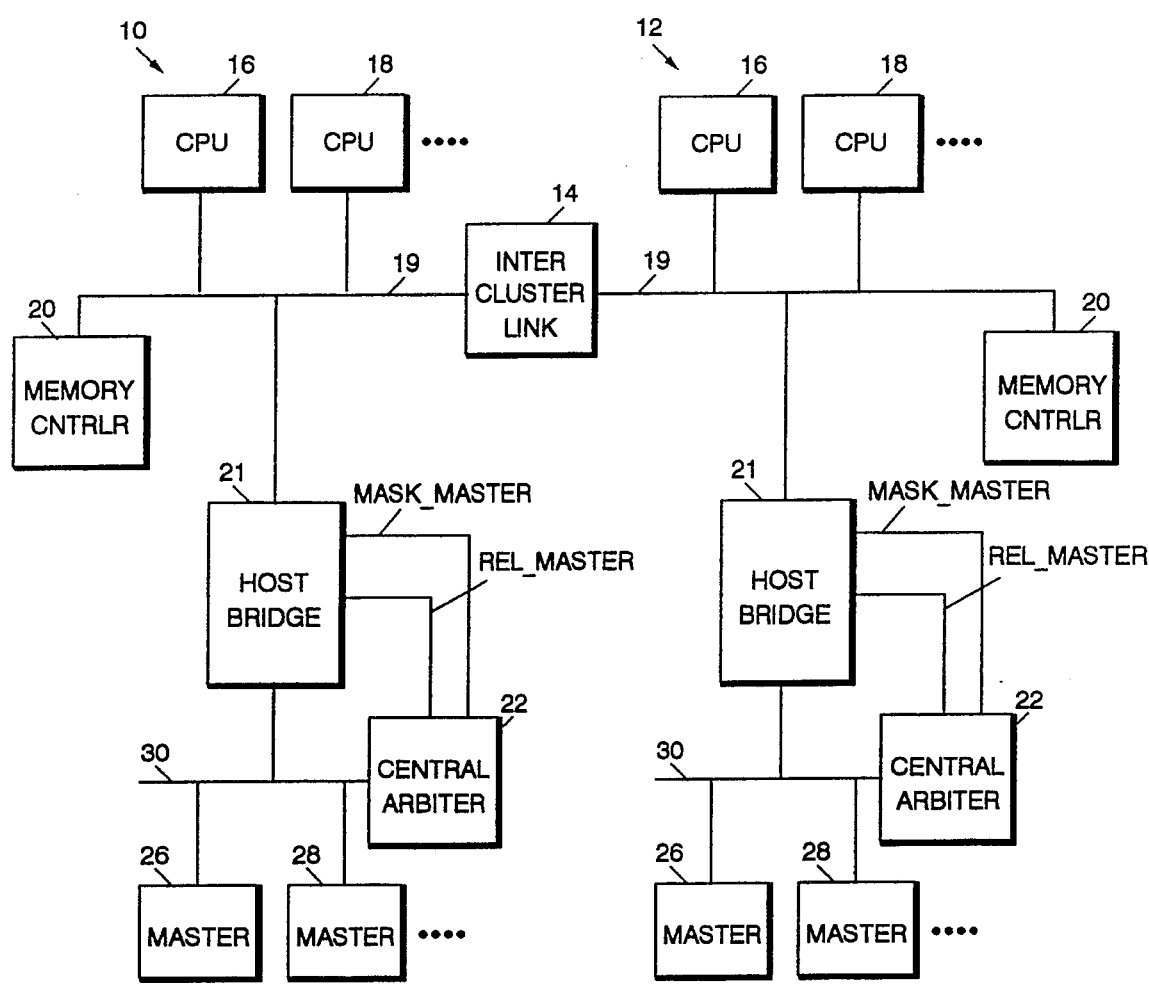
FIG. 2 is a block diagram similar to FIG. 1, but shows an embodiment that does not use a MASTER_ID bus.

In certain other embodiments of the invention, such as the exemplary embodiment of FIG. 2, the MASTER_ID bus is not used. Since the arbiter 22 knows which master is currently granted the bus 30, it will mask this current master when a retry occurs upon the assertion of the MASK_MASTER signal. Furthermore, since there is no MASTER_ID, when the REL_MASTER signal is activated, all of the masked masters are released and given priority over all of the masters which were previously unmasked. When only one master has been masked, this method achieves the same results as the other embodiments which use a MASTER_ID bus. However, if multiple masters have been masked, the efficiency may go down since the master 26 may be granted the bus 30 even though the controller 20 may have data for master 28. In this case, the controller 20 will re-mask master 26 by activating MASK_MASTER and executing a retry. Eventually, the master 28 will be granted the bus 30, complete its transaction and normal bus arbitration will occur.

In this other embodiment, creating priority for the recently unmasked masters can be performed in different manners, one method already being briefly described with respect to steps 74, 80–84 of FIG. 3. In this exemplary embodiment, a second set of masks (a TEMP_MASK) is used to temporarily block all of the normal masters. During the clock cycle in which REL_MASTER is received, a TEMP_MASK bit is set corresponding to all SPLIT_MASK bits which are currently reset. All of the SPLIT-MASK bits which are currently set are then reset. Several masters are released at a time, but this group of masters is given priority over all of the previously unmasked masters. The released priority masters then arbitrate based upon a normal priority. As each released master is granted the bus, its bit is set in the TEMP_MASK register. Once all of the masters have either a SPLIT_MASK or a TEMP_MASK bit set, the TEMP_MASK register is automatically reset, and the system resumes normal arbitration.

The embodiment of FIG. 2 also uses host bridges 21 between the multi-processor buses 19 and the PCI bus 30, the host bridges performing their normal functions. The memory controllers 20 are coupled in this embodiment to the multi-processor buses 19.

Although the present invention has been described with the use of a PCI bus, it is also applicable to other buses which have a back-off/retry feature that forces a master to leave a bus before a transaction is completed.

While the invention has been shown and described in detail, the foregoing description is in all aspects illustrative and not restrictive. It is therefore understood that numerous modifications and variations can be devised without departing from the scope of the invention.

What is claimed is:

1. A system comprising:

a bus;

a plurality of masters coupled to the bus, said masters including logic for requesting arbitration for the bus and for initiating a transaction upon being granted the bus;

a plurality of slaves coupled to the bus, with at least one of said slaves including logic for indicating readiness of the slave to complete said transaction; and an arbiter that includes logic for forcing a master off the bus when a slave from which the transaction has been requested is not ready to complete the transaction, and logic for preventing the master from re-arbitrating for the bus until the slave is ready to complete the transaction, where said logic for indicating readiness of the slave to complete the transaction includes a first output coupled to the arbiter and at which a first signal is produced, said first signal indicating that the slave is not ready to complete the transaction with a requesting master; and a second output coupled to the arbiter and at which a second signal is produced, said second signal indicating that the slave is ready to complete the transaction with the requesting master; and wherein the arbiter includes a masked master register that sets in response to the first signal a mask indicator identifying the requesting master;

logic for preventing the requesting master from re-arbitrating for the bus as long as the masked master register contains the mask indicator of the requesting master and for allowing the requesting master to re-arbitrate for the bus when the masked master register does not contain the mask indicator of the requesting master; and logic for resetting the mask indicator of the requesting master from the masked master register in response to the receipt of the second signal.

2. The system of claim 1, wherein the arbiter includes logic for collectively resetting the mask indicator for all masters for which the mask indicator was set whenever any one of the slaves produces the second signal.

3. The system of claim 2, wherein the arbiter includes:

a temporary mask register which sets a temporary indicator corresponding to each of the masters for which the mask indicators have been reset;

logic for temporarily assigning each of the masters for which the mask indicators have been reset higher priority for arbitration over all other masters until each of the higher priority masters has won the bus, each temporary indicators being reset upon the corresponding higher priority master winning the bus.

4. A system comprising:

a bus;

a plurality of masters coupled to the bus, said masters including logic for requesting arbitration for the bus and for initiating a transaction upon being granted the bus;

a plurality of slaves coupled to the bus, with at least one of said slaves including logic for indicating readiness of the slave to complete said transaction; and an arbiter that includes logic for forcing a master off the bus when a slave from which the transaction has been requested is not ready to complete the transaction, and logic for preventing the master from re-arbitrating for the bus until the slave is ready to complete the transaction, wherein the logic for indicating readiness of the slave to complete the transaction includes a first output coupled to the arbiter and at which a first signal is produced, said first signal indicating that the slave is not ready to complete the transaction with a requesting master, and a second output coupled to the arbiter and at which a second signal is produced, said second signal indicating that the slave is ready to complete the transaction with the requesting master; and a master identification bus coupled between the slave and the means for arbitrating, wherein the slave includes a third output, coupled to the master identification bus, at which a signal identifying the requesting master to the means for arbitrating is produced.

5. A system comprising:

a bus;

a plurality of masters coupled to the bus, said masters including logic for requesting arbitration for the bus and for initiating a transaction upon being granted the bus;

a plurality of slaves coupled to the bus, with at least one of said slaves including logic for indicating readiness of the slave to complete said transaction; and an arbiter that includes logic for forcing a master off the bus when a slave from which the transaction has been requested is not ready to complete the transaction, and logic for preventing the master from re-arbitrating for the bus until the slave is ready to complete the transaction, wherein the arbiter includes logic for assigning a highest priority to the master that has been prevented from re-arbitrating for the bus when said master is allowed to re-arbitrate for the bus.

6. An arbitration circuit for a bus to which a plurality of masters and at least one slave are coupled, the arbitration circuit comprising:

arbitration logic for arbitrating among the masters requesting the bus and granting the bus to a winning master of the arbitration;

logic for forcing the winning master off the bus in response to a slave from which a transaction is requested by the winning master being unable to complete a transaction, where the logic for forcing includes an input that receives a first signal from the slave from which a transaction is requested indicating that the slave is not ready to complete the transaction with a requesting master and a masked master register that sets in response to the first signal an indicator of the requesting master; and logic for preventing the requesting master from re-arbitrating for the bus as long as the slave is unable to complete the transaction.

7. The arbitration circuit of claim 6, wherein the logic for preventing is coupled to the masked master register and includes an input that receives a second signal from the slave indicating that the slave is ready to complete the transaction with the requesting master, the masked master register resets the indicator of the requesting master in response to the receipt of the second signal.

8. The arbitration circuit of claim 6, wherein the masked master register contains the identifier of the requesting master, and wherein the logic for preventing includes logic for allowing the requesting master to re-arbitrate for the bus when the masked master register does not contain the indicator of the requesting master.

9. The arbitration circuit of claim 8, further comprising a master identification bus input for receiving a master identification signal from the slave over a master identification bus.

10. A method of arbitrating for a bus, the method comprising the steps of:

granting the bus to a master arbitrating for the bus when the master wins the arbitration;

asserting by the master a request on the bus for a transaction on the bus with a slave;

asserting by the slave a first signal indicating that the slave is not ready to complete the transaction where the first signal includes a mask master signal, and retrying the master;

preventing the master from re-arbitrating for the bus when the slave asserts the first signal that the slave is not ready to complete the transaction by setting a mask indicator that identifies the master that is prevented from arbitrating for the bus, and allowing other masters to arbitrate for the bus;

asserting by the slave a second signal indicating that the slave is ready to complete the transaction when the slave is ready to complete the transaction; and allowing the master to re-arbitrate for the bus when the slave asserts the second signal and granting the master the bus when the master wins the arbitration.

11. The method of claim 10, wherein the second signal includes a mask release signal, and the step of allowing the master to re-arbitrate includes re-setting the mask indicator.

12. The method of claim 11, further comprising storing the mask indicators for each of the masters coupled to the bus in a mask register in a central arbitration circuit in which the mask indicators are set and re-set in accordance with the first and second signals.

13. The method of claim 12, wherein the bus is a connected transaction bus.

14. The method of claim 13, wherein the connected transaction bus is a peripheral component interface (PCI) bus.

15. The method of claim 11, further comprising storing the mask indicators for each of the masters coupled to the bus in mask registers in said masters, wherein the masters perform a distributed arbitration for the bus, the mask indicators being set and re-set in said mask registers in accordance with the first and second signals.

16. The method of claim 10, wherein the first and second signals further include a master identification signal indicating the specific master that asserted the request for the transaction.

17. The method of claim 16, further comprising the step of assigning the master that has been prevented from re-arbitrating for the bus a highest priority when said master is allowed to re-arbitrate for the bus.

18. The method of claim 17, wherein the step of assigning includes re-setting the mask indicator of the master identified by the master identification signal when the slave asserts the second signal.

19. The method of claim 18, further comprising the steps of a plurality of slaves asserting second signals related to requests from different masters, and assigning highest priority for re-arbitration to those masters identified in said second signals in an order in which the second signals are asserted.

20. The method of claim 10, wherein a plurality of masters and slaves are coupled to the bus, the method further comprising storing the mask indicators for each of the masters coupled to the bus in a mask register in a central arbitration circuit in which the mask indicators for the individual masters are individually set in accordance with assertion of the first signal for a transaction involving the individual master, and collectively re-setting the mask indicator for all masters for which the mask indicator was set whenever any of the slaves asserts the second signal.

21. The method of claim 20, further comprising:

storing a list of the masters for which the mask indicators have been re-set;

assigning each of the masters for which the mask indicators have been re-set priority over all other masters;

arbitrating among the masters that have been assigned priority;

granting winning masters the bus; and resuming arbitration among all masters after each of the masters that were assigned priority have been granted the bus.

22. A method of arbitrating for a bus, the method comprising the steps of:

granting the bus to a master arbitrating for the bus when the master wins the arbitration;

asserting by the master a request on the bus for a transaction on the bus with a slave;

asserting by the slave a first signal indicating that the slave is not ready to complete the transaction and retrying the master;

preventing the master from re-arbitrating for the bus when the slave asserts the first signal that the slave is not ready to complete the transaction, and allowing other masters to arbitrate for the bus;

assigning the master that has been prevented from re-arbitrating for the bus a highest priority when said master is allowed to re-arbitrate for the bus;

asserting by the slave a second signal indicating that the slave is ready to complete the transaction when the slave is ready to complete the transaction; and allowing the master to re-arbitrate for the bus when the slave asserts the second signal and granting the master the bus when the master wins the arbitration.

23. A method of transferring data over a bus, the method comprising the steps of:

granting the bus to a master arbitrating for the bus when the master wins the arbitration;

asserting by the master a request on the bus for a transfer of data over the bus from a slave;

asserting by the slave a first signal indicating that the slave is not ready to complete the transaction which is a mask master signal and retrying the master;

preventing the master from re-arbitrating for the bus when the slave asserts the signal that the slave is not ready to complete the transaction, setting a mask indicator that identifies the master that is prevented from arbitrating for the bus, and allowing other masters to arbitrate for the bus;

asserting by the slave a second signal indicating that the slave is ready to complete the transaction when the slave is ready to complete the transaction;

allowing the master to re-arbitrate for the bus and granting the master the bus when the master wins the arbitration;

re-asserting by the master the request on the bus for the transfer of data over the bus from the slave;

sending the requested data over the bus from the slave to the master.

24. The method of claim 23, wherein the second signal includes a mask release signal, and the step of allowing the master to re-arbitrate includes re-setting the mask indicator.

25. The method of claim 24, further comprising storing the mask indicators for each of the masters coupled to the bus in a mask register in a central arbitration circuit in which the mask indicators are set and re-set in accordance with the first and second signals.

26. The method of claim 25, wherein the bus is a connected transaction bus.

27. The method of claim 26, wherein the connected transaction bus is a peripheral component interface (PCI) bus.

28. The method of claim 24, further comprising storing the mask indicators for each of the masters coupled to the bus in mask registers in said masters, wherein the masters perform a distributed arbitration for the bus, the mask indicators being set and re-set in said mask registers in accordance with the first and second signals.

29. The method of claim 23, wherein the first and second signals further include a master identification signal indicating the specific master that asserted the request for the transaction.

30. The method of claim 29, further comprising the step of assigning the master that has been prevented from re-arbitrating for the bus a highest priority when said master is allowed to re-arbitrate for the bus.

31. The method of claim 30, wherein the step of assigning includes re-setting the mask indicator of the master identified by the master identification signal when the slave asserts the second signal.

32. The method of claim 31, further comprising the steps of a plurality of slaves asserting second signals related to requests from different masters, and assigning highest priority for re-arbitration to those masters identified in said second signals in an order in which the second signals are asserted.

33. The method of claim 23, wherein a plurality of masters and slaves are coupled to the bus, the method further comprising storing the mask indicators for each of the masters coupled to the bus in a mask register in a central arbitration circuit in which the mask indicators for the individual masters are individually set in accordance with assertion of the first signal for a transaction involving the individual master, and collectively re-setting the mask indicator for all masters for which the mask indicator was set whenever any of the slaves asserts the second signal.

34. The method of claim 33, further comprising:

storing a list of the masters for which the mask indicators have been re-set;

assigning each of the masters for which the mask indicators have been re-set priority over all other masters;

arbitrating among the masters that have been assigned priority;

granting winning masters the bus; and resuming arbitration among all masters after each of the masters that were assigned priority have been granted the bus.

35. A method of transferring data over a bus, the method comprising the steps of:

granting the bus to a master arbitrating for the bus when the master wins the arbitration;

asserting by the master a request on the bus for a transfer of data over the bus from a slave;

asserting by the slave a first signal indicating that the slave is not ready to complete the transaction and retrying the master;

preventing the master from re-arbitrating for the bus when the slave asserts the signal that the slave is not ready to complete the transaction, and allowing other masters to arbitrate for the bus;

asserting by the slave a second signal indicating that the slave is ready to complete the transaction when the slave is ready to complete the transaction;

allowing the master to re-arbitrate for the bus and granting the master the bus when the master wins the arbitration;

re-asserting by the master the request on the bus for the transfer of data over the bus from the slave;

sending the requested data over the bus from the slave to the master; and assigning the master that has been prevented from re-arbitrating for the bus a highest priority when said master is allowed to re-arbitrate for the bus.

* * * * *